US011551370B2

(12) United States Patent
Marsh

(10) Patent No.: US 11,551,370 B2
(45) Date of Patent: Jan. 10, 2023

(54) REMOTE INSPECTION AND APPRAISAL OF BUILDINGS

(71) Applicants: Nationwide Management Services, Inc., Chandler, AZ (US); INCENTER LLC, Irving, TX (US)

(72) Inventor: John P Marsh, Maricopa, AZ (US)

(73) Assignee: Nationwide Management Services, Inc., Chandler, AZ (US)

( * ) Notice: Subject to any disclaimer, the term of this patent is extended or adjusted under 35 U.S.C. 154(b) by 0 days.

(21) Appl. No.: 17/555,321

(22) Filed: Dec. 17, 2021

(65) Prior Publication Data

US 2022/0398762 A1    Dec. 15, 2022

Related U.S. Application Data

(63) Continuation-in-part of application No. 17/127,988, filed on Dec. 18, 2020, now abandoned.

(51) Int. Cl.
| | | |
|---|---|---|
| *G06T 7/60* | (2017.01) | |
| *G06T 3/00* | (2006.01) | |
| *G06T 11/00* | (2006.01) | |
| *G06Q 30/02* | (2012.01) | |

(52) U.S. Cl.
CPC ........... *G06T 7/60* (2013.01); *G06Q 30/0278* (2013.01); *G06T 3/0031* (2013.01); *G06T 11/00* (2013.01)

(58) Field of Classification Search
None
See application file for complete search history.

(56) References Cited

U.S. PATENT DOCUMENTS

| | | |
|---|---|---|
| 8,456,711 B2 | 6/2013 | Zhang et al. |
| 8,593,506 B2 | 11/2013 | Peleg et al. |
| 9,070,194 B2 | 6/2015 | Lee et al. |
| 9,640,142 B2 | 5/2017 | Rn et al. |
| 9,747,392 B2 | 8/2017 | Pitzer et al. |
| 9,977,977 B2 | 5/2018 | Govil et al. |
| 10,163,271 B1 | 12/2018 | Powers et al. |
| 11,094,135 B1 | 8/2021 | Palmer et al. |

(Continued)

OTHER PUBLICATIONS

S. Goyal, C. Chattopadhyay and G. Bhatnagar, "Plan2Text: A framework for describing building floor plan images from first person perspective," 2018 IEEE 14th International Colloquium on Signal Processing & Its Applications (CSPA), 2018, pp. 35-40, doi: 10.1109/CSPA.2018.8368681. (Year: 2018).*

(Continued)

*Primary Examiner* — James A Thompson
(74) *Attorney, Agent, or Firm* — Edison Law Group

(57) ABSTRACT

A building appraisal system conducted by a remote inspector located away from a building. A remote user connected to a user on site can share images, measurements and other data to conduct an examination of the building such as an appraisal. A processor coupled to an image sensor can be configured to receive a gross floor area of the building. Images of an interior room of the building are stored in memory. The processor determines a planar surface in the images corresponding to a floor surface of the interior room and a plurality of corners in the images forming vertices of a bounded floor area on the floor surface. The processor can compute an adjusted floor area of the building that includes the bounded floor area subtracted from the gross floor area.

3 Claims, 14 Drawing Sheets

(56) References Cited

U.S. PATENT DOCUMENTS

| | | | |
|---|---|---|---|
| 2017/0031560 A1 | 2/2017 | Filip et al. | |
| 2018/0075168 A1* | 3/2018 | Tiwari | G06T 3/0068 |
| 2020/0007841 A1* | 1/2020 | Sedeffow | G06T 7/70 |
| 2020/0034623 A1 | 1/2020 | Suzuki | |
| 2020/0242786 A1 | 7/2020 | Shao et al. | |
| 2020/0258285 A1* | 8/2020 | Dempsey | G06T 15/20 |
| 2020/0302584 A1 | 9/2020 | Zhang et al. | |
| 2020/0349350 A1* | 11/2020 | Toh | G06T 7/75 |
| 2021/0064216 A1* | 3/2021 | Li | G06T 11/00 |
| 2021/0125397 A1* | 4/2021 | Moulon | G06T 7/73 |

OTHER PUBLICATIONS

E. Turner, P. Cheng and A. Zakhor, "Fast, Automated, Scalable Generation of Textured 3D Models of Indoor Environments," in IEEE Journal of Selected Topics in Signal Processing, vol. 9, No. 3, pp. 409-421, Apr. 2015, doi: 10.1109/JSTSP.2014.2381153. (Year: 2015).*
https://canvas.io/.
https://canvas.io, Retrieved Dec. 13, 2021, main page.

* cited by examiner

REMOTE INSPECTION AND APPRAISAL OF BUILDINGS

RELATED APPLICATIONS

This is a continuation-in-part application of U.S. Ser. No. 17/127,988, filed on Dec. 18, 2020, which is incorporated by reference herein in its entirety.

BACKGROUND

The present invention is directed toward techniques and devices for conducting building appraisals by an inspector located remotely from the building.

Gross Living Area (GLA) is generally defined as above-grade residential living space excluding unheated areas such as porches, garages, and balconies. An accurate GLA calculation for a subject property is important when generating a residential property appraisal.

Building inspectors and appraisers typically visit a property to conduct a physical and manual inspection of the property. As part of the inspection or appraisal process, inspectors obtain GLA measurements and evaluate property conditions. Although the information gathered by building inspectors is important to real estate transactions, traditional building inspections can be time consuming and expensive.

BRIEF SUMMARY

Accordingly, an aspect of the present invention includes an apparatus for conducting a building appraisal by a remote inspector. The apparatus includes an image sensor, a communication module configured to transmit and receive wireless communication signals to and from a computer network, and a memory operatively coupled to the image sensor. A processor is operatively coupled to the image sensor, the memory, the display, and the communication module. The processor is configured to execute instructions stored in the memory to cause the processor to receive a gross floor area of the building through the communication module and store images from the image sensor of an interior room of the building. The images are processed to determine a planar surface in the images corresponding to a floor surface of the interior room. The images are additionally processed to determine a plurality of corners in the images forming vertices of a bounded floor area on the floor surface. The processor transmits an adjusted floor area of the building. The adjusted floor area includes the bounded floor area subtracted from the gross floor area.

Another example aspect of the present invention is a method of conducting a building appraisal by a remote inspector. The method includes receiving, by a processor of a computing device, a gross floor area of a building through a computer network. A capturing operation captures, with an image sensor, a plurality of images of an interior room of the building. A determining operation determines, by the processor of the computing device, a planar surface in the images corresponding to a floor surface of the interior room. An identifying operation identifies, by the processor of the computing device, a plurality of corners in the images forming vertices of a bounded floor area on the planar surface. Another determining operation determines, by the processor of the computing device, an adjusted floor area. The adjusted floor area includes the bounded floor area subtracted from the gross floor area. A transmitting operation transmits, by the processor of the computing device, the adjusted floor area.

Yet another example aspect of the present invention is a computer program product for conducting a building appraisal by a remote inspector. The computer program includes computer readable program code configured to receive a gross floor area of a building through a computer network, capture a plurality of images of an interior room of the building, determine a planar surface in the images corresponding to a floor surface of the interior room, identify a plurality of corners in the images forming vertices of a bounded floor area on the planar surface, determine an adjusted floor area including the bounded floor area subtracted from the gross floor area, and transmit the adjusted floor area.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

Figure 1:
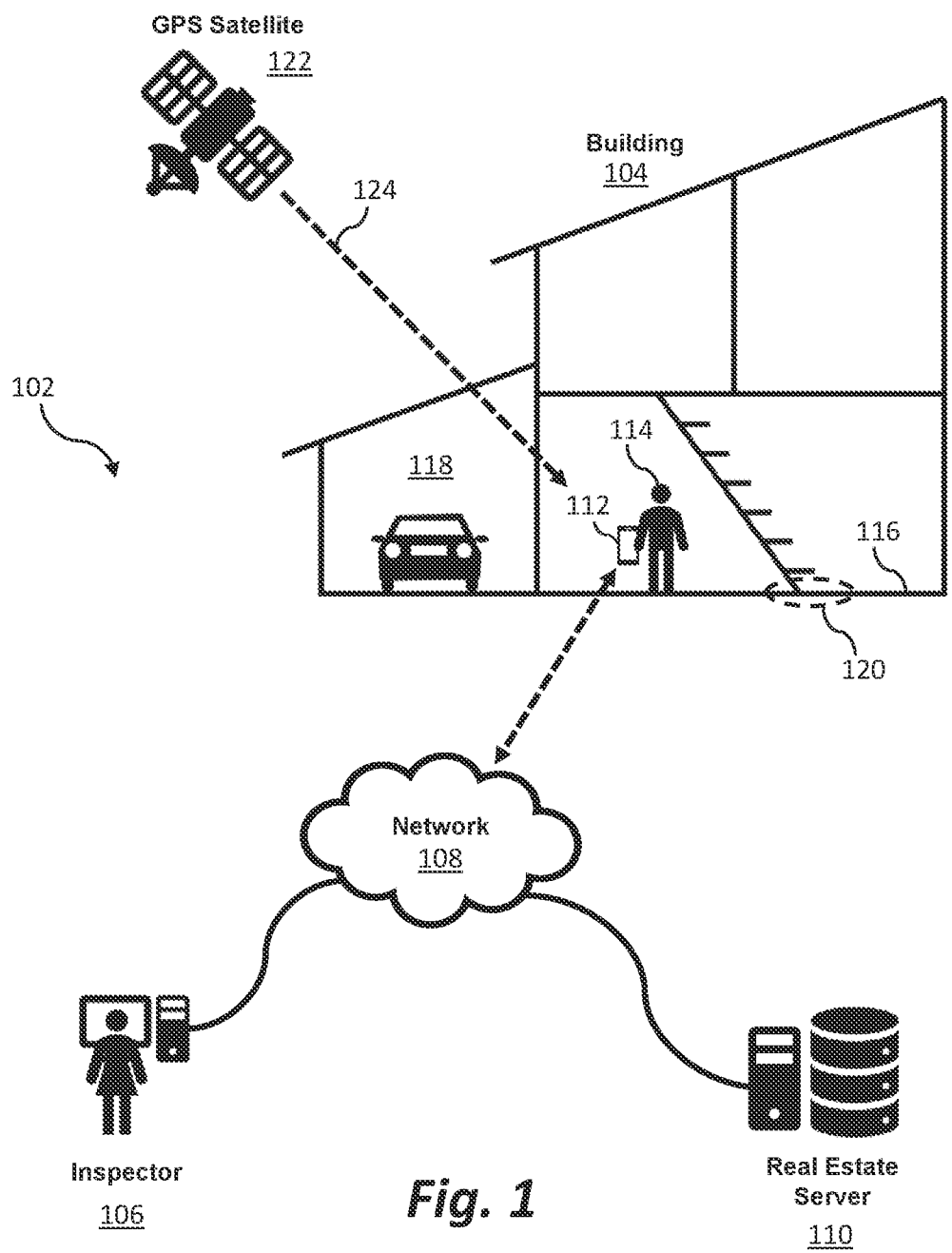
FIG. 1 shows an example inspection environment for an embodiment of the invention.

The present invention is described with reference to embodiments of the invention. Throughout the description of the invention reference is made to FIGS. 1-11. When referring to the figures, like structures and elements shown throughout are indicated with like reference numerals.

Several embodiments of the invention with reference to the appended drawings are now explained. While numerous details are set forth, it is understood that some embodiments of the invention may be practiced without these details. In other instances, well-known circuits, structures, and techniques have not been shown in detail so as not to obscure the understanding of this description.

FIG. 1 shows an example environment 102 for an embodiment of the invention. The environment 102 includes a building 104 assessed by a remote inspector 106. The remote inspector 106 is located a distance away from the building 104 and is not inside the building. An inspector computer 108, operated by the remote inspector, is connected to a computer network 110, such as the Internet. The environment 102 additionally includes a real estate server 110 connected to the computer network 110.

The real estate server 110 includes a database providing information in response to building queries. The real estate server 110 may be managed by a government agency or a private entity. In one embodiment of the invention, the remote inspector obtains a gross floor area of the building 104 from the real estate server 110. The gross floor area is the entire floor area of a building. For example, the gross floor area of a building can be the building's footprint area multiplied by the number of floors in the building.

An important factor in assessing the building 120 is calculating an adjusted floor area of the building 120. The adjusted floor area is determined by subtracting certain non-qualifying areas from the gross floor area of the building. These non-qualifying areas may be rooms below grade, staircases, unheated areas such as porches and balconies, and unfinished areas such as a garage. Inspectors in different localities may have different standards for whether a building area is considered a non-qualifying area. Additionally, the type of building (i.e., residential or commercial) may change whether an area is considered non-qualifying or qualifying. In some regions, the adjusted floor area may be referred to as the gross living area (GLA) of a residential building.

The inspector 106 determines the non-qualifying areas in the building by communicating with an inspection device 112 over the computer network 108. In one embodiment, the inspection device 112 is a handheld device coupled to the computer network 108. The inspection device 112 may be carried by a device user 114 located within the building 104. The device user 114 may, for example, be the building owner or resident. It is contemplated the inspection device 112 may be a smartphone, tablet, or other handheld computer programmed to provide the functionality described herein.

As discussed in more detail below, the inspection device 112 includes an image sensor for capturing images of a real-world scene. A processor in the inspection device 112 is operatively coupled to the image sensor. The processor is configured to process the captured images to determine a planar surface in the images corresponding to a floor surface 116 in the real-world scene. The processor also uses the images to determine corners in the captured images that form vertices of a bounded floor area on the planar surface.

For example, it may be the garage 118 in the building 104 constitutes a non-qualifying area in a particular jurisdiction. The remote inspector 106 can instruct the device user 114 to enter the garage 118 and point the inspection device 112 at a corner of the garage 118. A planar surface corresponding to the floor surface of the garage 118 is determined by the processor. Using the image sensor of the inspection device 112, images of the garage 118 are captured. The remote inspector 106 can further instruct the device user 114 to move around the garage 118 such that the processor in the inspection device 112 detects the garage corners captured by the image sensor on the garage floor. Once the bounded floor area of the garage 118 is determined, the processor calculates an adjusted floor area of the building 104 by subtracting the adjusted floor area from the gross floor area.

A non-qualifying area may also be a portion of a room in a building. For example, it may be that a staircase landing 120 in the building 104 constitute a non-qualifying area in a particular jurisdiction. In such a situation, the remote inspector 106 can direct the device user 114 to aim the inspection device 112 at the staircase landing 120 such that the image sensor captures images of the staircase landing 120. A processor at the inspection device 112 again determines a bounded floor area for the staircase landing 120 by detecting staircase landing corners on the floor surface. The adjusted floor area of the building is updated by further subtracting the staircase landing's bounded floor area from the gross floor area.

Calculating the adjusted floor area may require subtracting several separate bounded floor areas from the gross floor area. Thus, it will be understood by those skilled in the art that the process of capturing images of an interior room of the building 104, identifying corners in the captured images forming vertices of a bounded floor area on a planar surface corresponding to a floor surface of an interior room, and calculating an adjusted floor area of the building 104 by subtracting the bounded floor area from the gross floor area may be iterated for each non-qualifying area in the building 104.

After the adjusted floor area of the building 104 is calculated, the adjusted floor area is transmitted to the remote inspector 106 via the computer network 108 for review and recordation. The remote inspector 106 may use the adjusted floor area to, for example, generate an appraisal report, find comparable properties, and determine the value of the building 104.

In one embodiment, the inspection device 112 can employ image stitching technology. The processor in the inspection device 112 may digitally combine the captured images to produce one or more panorama images of the real-world scene. For example, as the image sensor captures images of the interior room, the processor combines the images to form a 360-degree panoramic image of the room. The panorama image can be transmitted through the computer network 108 to the remote inspector 106.

In another embodiment, the inspection device 112 may include a Global Positioning System (GPS) receiver. The GPS receiver obtains GPS signals 124 from human-made satellites 122 orbiting the Earth. The GPS signals 124 are used to calculate the current location of the inspection device 112 on Earth by the processor. The processor also receives a historical location of the building 104 over the computer network 108. For example, the historical location of the building 104 may be stored in the real estate server 110. If the current location of the inspection device 112 does not match the historical location of the building 104, the processor transmits an alert message to the remote inspector 106. This helps ensure the building 104 inspected by the inspection device 112 is same building the remote inspector 106 intends to inspect.

Figure 2:
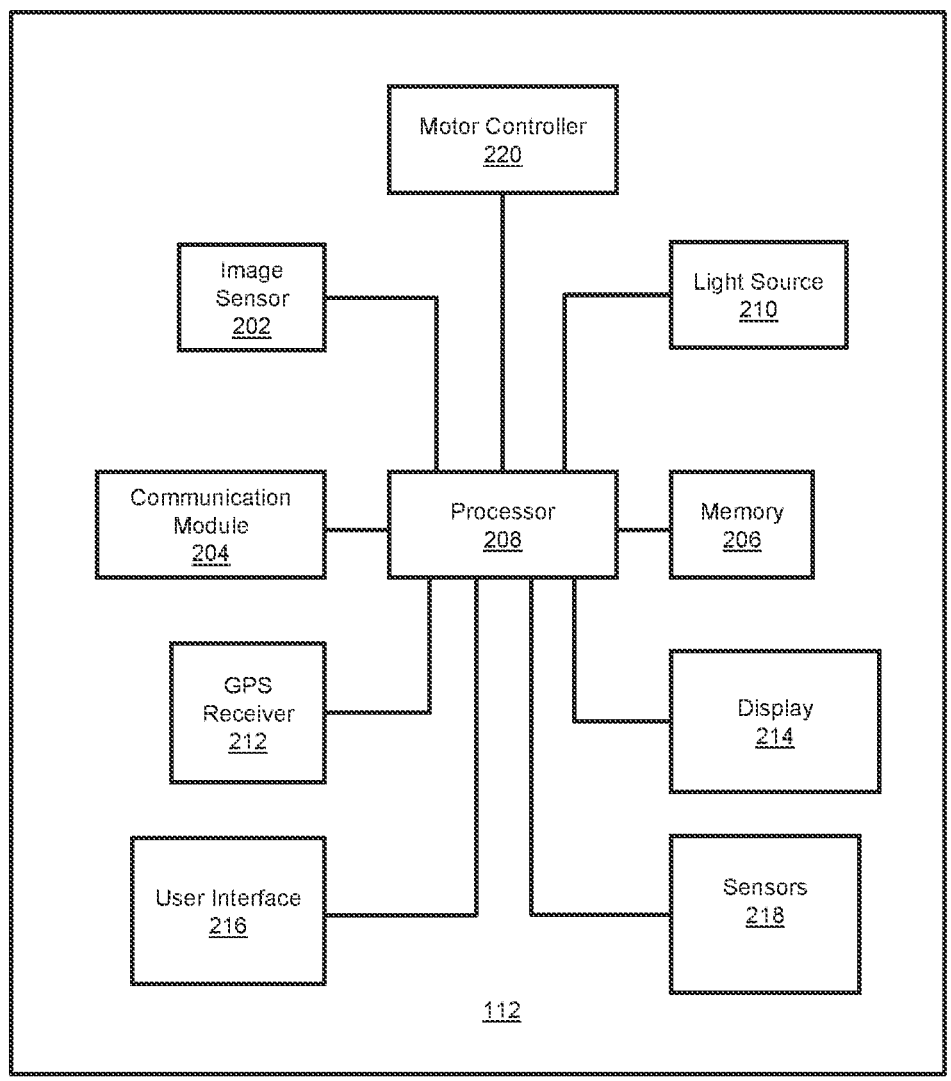
FIG. 2 shows an example inspection device contemplated by the present invention.

FIG. 2 shows an example inspection device 112 contemplated by the present invention. The inspection device 112 includes an image sensor 202, a communication module 204, a memory 206, and a processor 208. The image sensor 202, communication module 204, and memory 206 are operatively coupled to the processor 208.

The image sensor 202 is configured to capture images of a real-world scene. The image sensor 202 has a field of view and includes an array of imaging sensors, such as CMOS active-pixel image sensors or charge-coupled device sensors. The image sensor 202 may also include other known image capture technologies, such as optical lenses, a shutter, and an autofocus mechanism.

The processor 208 executes program instructions stored in memory 206. The memory 206 includes read-only memory (ROM) and random-access memory (RAM). Various technologies known to those skilled in the art may be used in combination to implement the memory 206, such as static memory, dynamic memory, and/or non-volatile memory.

Instructions stored in the memory 206 cause the processor 208 to store images from the image sensor 202 of an interior room of the building in memory 206. In one embodiment, images captured by the image sensor 202 are stored with a timestamp to ensure they are current images of the property. The instructions additionally cause the processor to process the images to determine a planar surface corresponding to a floor surface of an interior room of a building. The images are further processed to determine corners in the images forming vertices of a bounded floor area on the planar surface.

The communication module 204 is used to communicate with cellular and/or computer networks. The communication module 204 includes an antenna and a transceiver to transmit and receive information over various wireless network standards, such as GSM, CDMA, IEEE 802.11, and Bluetooth®. In one embodiment, the communication module 204 is used to conduct audio and/or video calls between the remote inspector and the device user. It is contemplated a WebRTC server can be used to provide provides real-time communication between the remote inspector and the device user.

As discussed above, the processor 208 is configured to receive a gross floor area of the building through the communication module 204. In one embodiment, the communication module 204 transmits real-time images from the image sensor 202 to a remote inspector. After the gross floor area is received and the bounded floor area is determined, the processor 208 calculates an adjusted floor area of the building. The adjusted floor area includes the bounded floor area subtracted from the gross floor area. The processor 208 then transmits an adjusted floor area to a remote inspector via the communication module 204.

The processor 208 may digitally combine images of an interior room of the building to produce a panorama image, also referred to as an equirectangular-panoramic image. The panorama image can provide an immersive experience by allowing the image viewer to virtually look around the interior room at various angles. The processor 208 may be configured to transmit the panorama image to a remote inspector via the communication module 204.

In one embodiment, the processor 208 may be configured to receive a magnification message from the communication module 204. For example, a remote inspector may transmit a magnification message to the inspection device 112. The magnification message includes a magnification factor. In response to receipt of the magnification message, the processor 208 causes the image sensor 202 to magnify the captured images. The magnification message can assist the remote inspector view and capture building details during a building examination.

The inspection device 112 may include a light source 210 to illuminate a field of view of the image sensor 202. The processor 208 may be configured to receive a light activation message from the communication module 204. For example, a remote inspector may transmit a light activation message to the inspection device 112 to illuminate images captured by the image sensor 202. In response to receipt of the magnification message, the processor 208 causes the light source 210 to activate a light in response to the light activation message. The light activation message can assist the remote inspector by illuminating scenes captured by the image sensor 202 in conditions with poor ambient lighting. Similarly, the processor 208 can deactivate the light source 210 to conserve the inspection device's battery life.

The inspection device 112 may include a GPS receiver 212. The GPS receiver 212 receives signals from GPS satellites that enable the processor 208 to compute the inspection device's current location. In one embodiment, images captured by the image sensor 202 are stored with the computed GPS location as metadata to ensure they are from the inspected property. The processor 208 compares the current location of the inspection device 112 to a historical location of the building under inspection to ensure the correct building is being inspected. The historical location of the building is received by the communication module 204. If the current location of the inspection device 112 does not match the historical location of the building, the communication module 204 transmits an alert message to the remote inspector. Other methods of obtaining the inspection device's current location are contemplated. For example, Google location services may be used to determine the inspection device's current location.

The processor 208 can receive a pointer message from a remote inspector through the communication module 204. The pointer message includes a pointer location. In response to the pointer message, the processor 208 is configured to digitally overlay a pointer image on the real-time images captured by the image sensor 202.

The pointer image guides a user of the inspection device 112 to aim the image sensor 202 at a location indicated by the pointer location. The display 214 shows the pointer image overlayed on the real-time images to guide the device user to the desired location. For example, the pointer image may initially be positioned at the edge of the display 214. As the user aims the image sensor 202 closer to the desired location, the pointer image moves closer to the center of the display 214. This indicates to the device user that the device 112 is being moved to the desired location. On the other hand, if the device user moves the device 112 away from the desired location, the pointer image is moved away from the display center in a direction opposite the device movement.

In addition to the display 214, the inspection device 112 may include a user interface 216 operatively coupled to the processor 208 for communicating with a device user. The user interface 216 can include, for example, a microphone, speakers, a touch sensor, a keypad, a fingerprint reader, and/or haptic feedback.

The inspection device 112 may also include additional sensors 218 operatively coupled to the processor 208 for conducting a building inspection. For example, the inspection device 112 may include, for example, an Inertial Measurement Unit (IMU), a proximity sensor, a LiDAR scanner, a temperature sensor, a fingerprint sensor, a moisture sensor, and/or infrared sensor.

In one embodiment, the inspection device 112 is capable of locomotion. A motor controller 220 operatively coupled to the processor 208 is used to drive motors and actuators.

Figure 3:
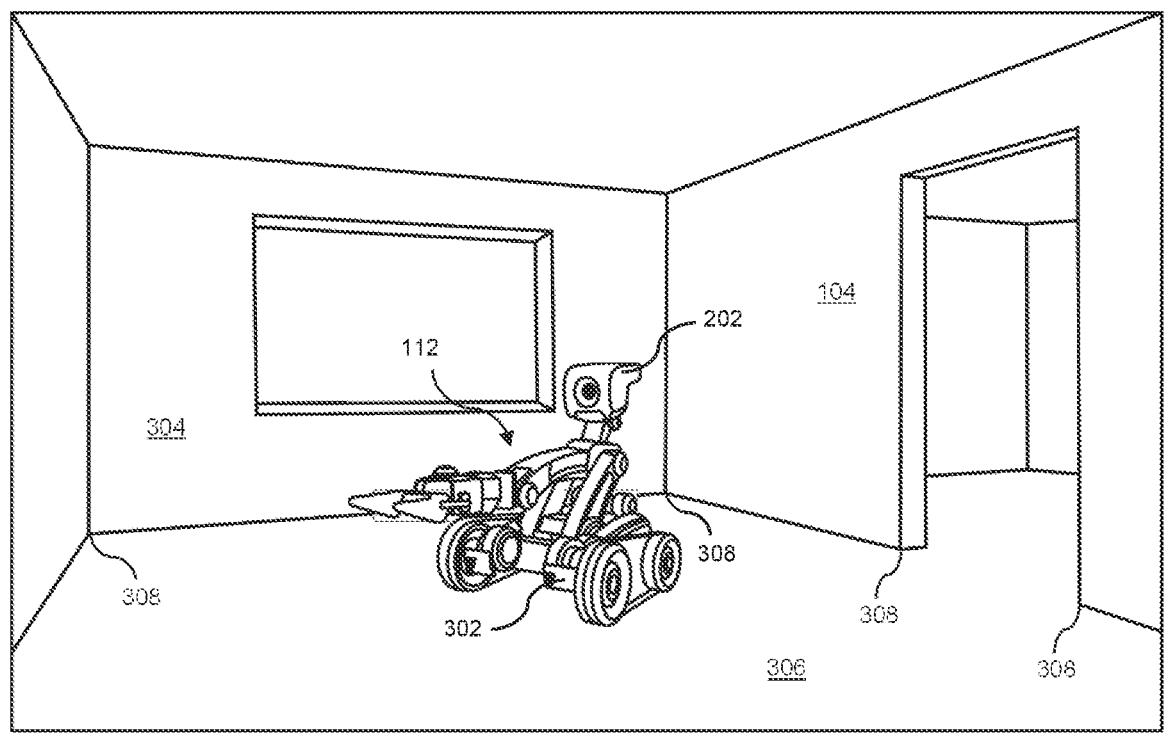
FIG. 3 shows the inspection device configured as a remotely drivable robot.

For example, FIG. 3 shows the inspection device 112 configured as a remotely drivable robot. The inspection device 112 includes a plurality of motors 302 enabling it to navigate within the building 104. A drivetrain may be configured to ascend and descend stairs. It is contemplated that the inspection device 112 may be capable of autonomous drive. For example, a remote inspector may drive the inspection device to a staircase base and initiate an autonomous stair climbing routine. The inspection device 112 may include servos to pan and tilt and image sensor 202 as it is driven through the building 104.

As mentioned above, a remote inspector may control movement of the inspection device 112 from outside the building 104. For example, the remote inspector may drive the inspection device 112 to a non-qualifying interior room 304 of the building 104 using a live image stream from the image sensor 202 transmitted by the communication module. The processor of the inspection device 112 determines a planar surface in the images corresponding to a floor surface 306 of the interior room 304. As the inspection device 112 pans the interior room 304, the processor identifies a plurality of corners 308 in the images forming vertices of a bounded floor area on the planar surface. Furthermore, the processor determines an adjusted floor area by subtracting the bounded floor area from the building's gross floor area.

Figure 4:
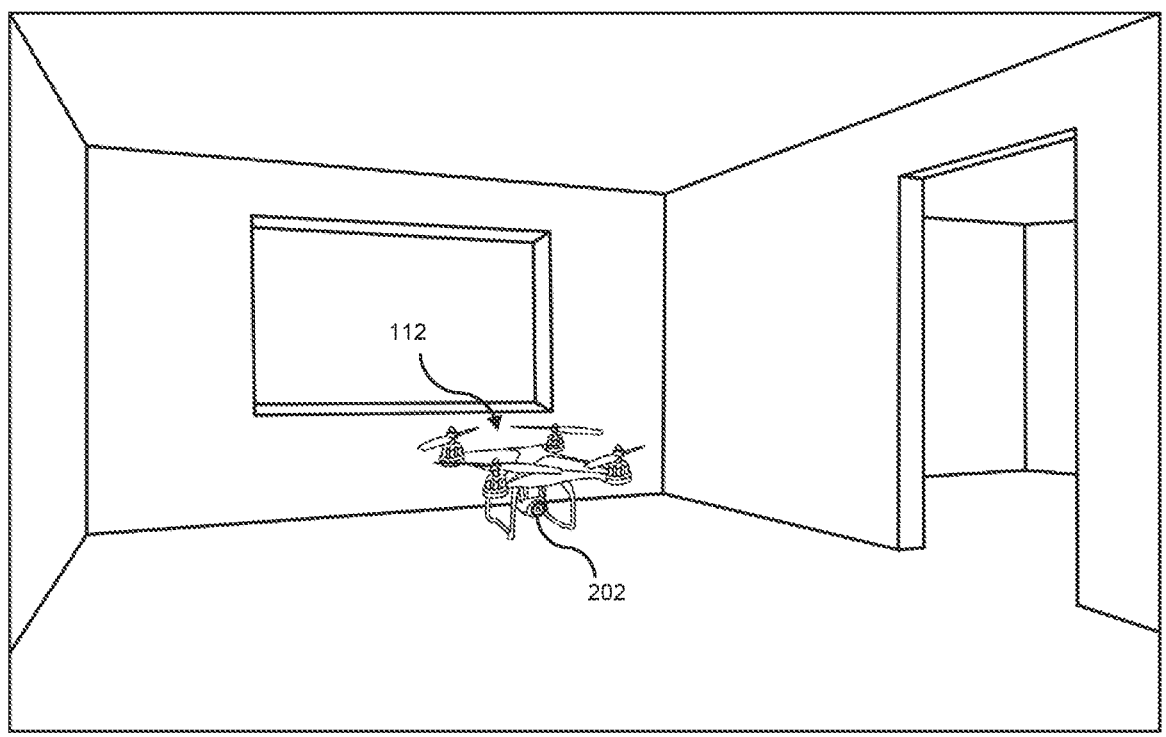
FIG. 4 shows another embodiment of the inspection device configured as an unmanned aerial vehicle (UAV).

FIG. 4 shows another embodiment of the inspection device 112 configured as a quadcopter or unmanned aerial vehicle (UAV). In this example embodiment, the inspection device 112 can be remotely flown by the inspector. The image sensor 202 may be used for both navigation purposes and building inspection purposes. The inspection device 112 may pan and tilt the image sensor 202 to identify room corners and determine a bounded floor area on a planar surface.

Figure 5A:
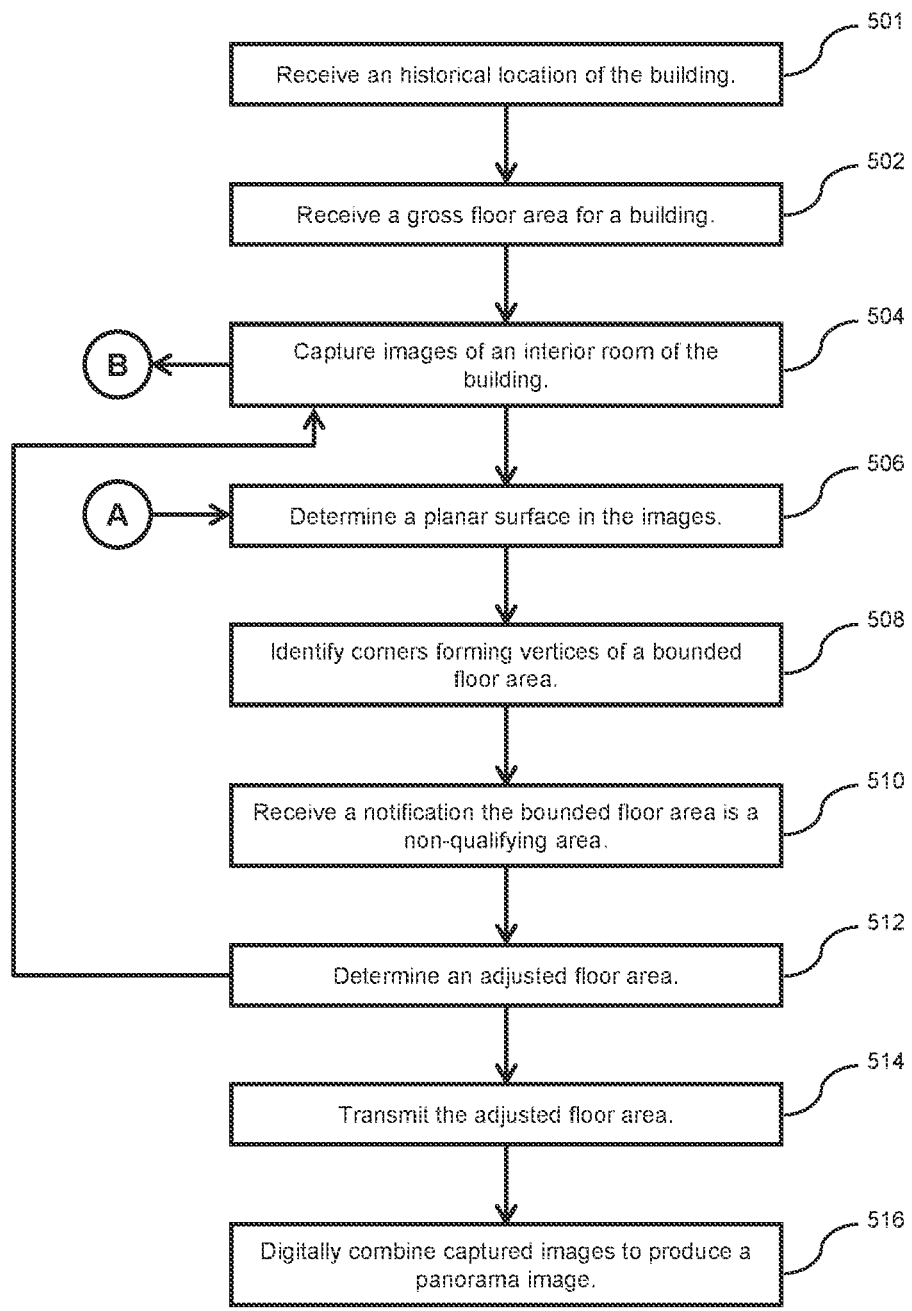
FIGS. 5A-5C illustrate an example method for conducting a building appraisal by a remote inspector, as contemplated by the present invention.
Figure 5B:
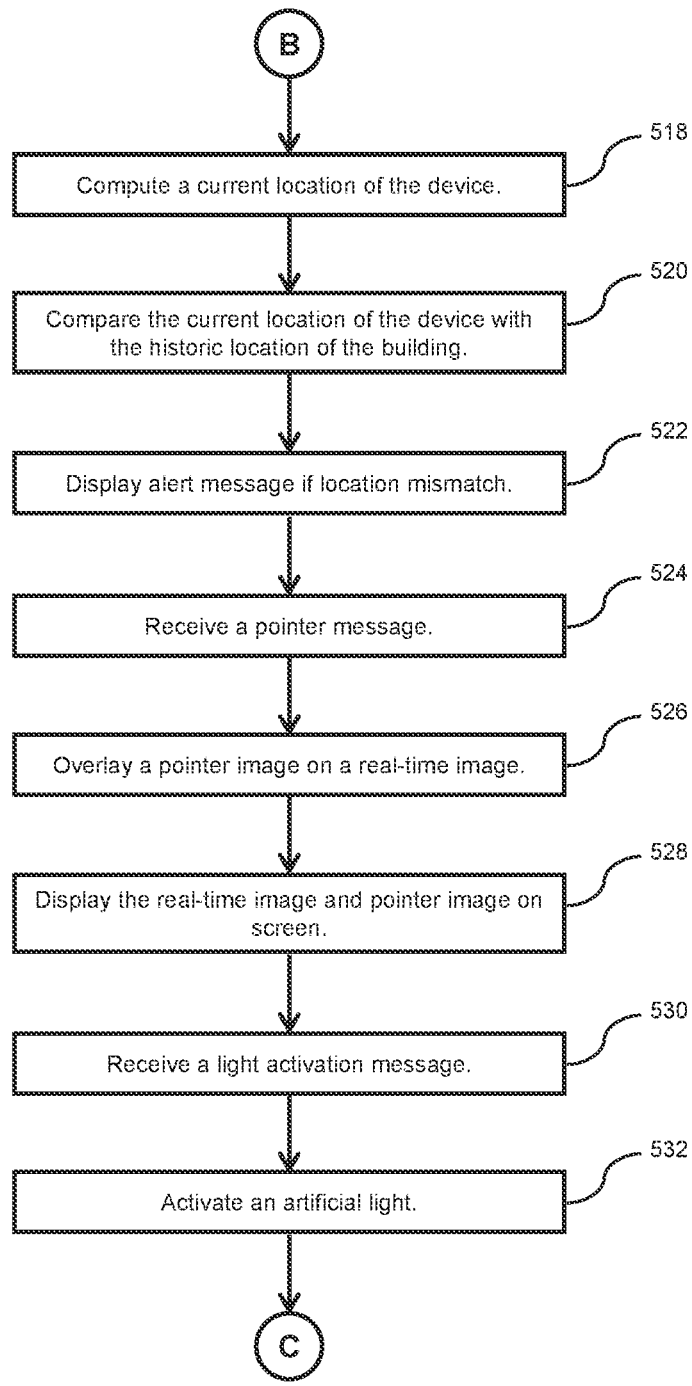
Figure 5C:
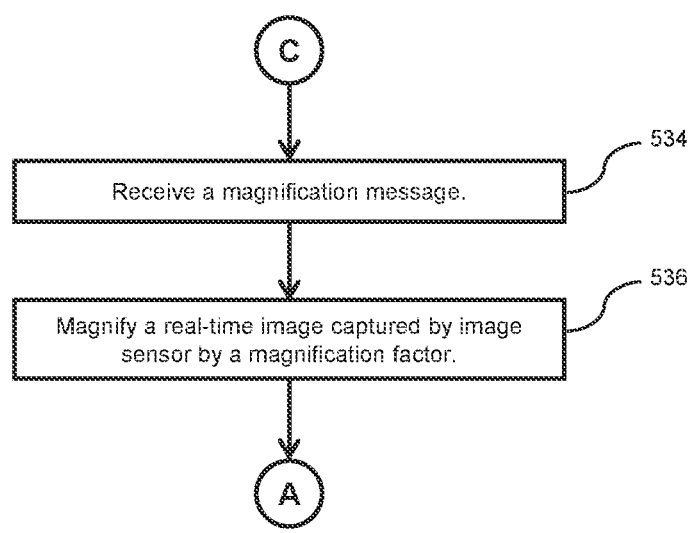

FIGS. 5A-5C illustrate an example method for conducting a building appraisal by a remote inspector, as contemplated by the present invention. The method includes receiving step 501.

At receiving step 501, a processor of a computing device receives a historical location of a building through a computer network. The historical location of the building can be used to confirm that the computing device is at the intended building during inspection. The historical location may come from various data sources, such as official government records, commercial records, or surveying service providers. After receiving step 501 is completed, control passes to receiving step 502.

At receiving step 502, a processor of a computing device receives a gross floor area for a building through a computer network. As discussed above, the gross floor area may be computed using, for example, photogrammetry. An image of the building's roof can be analyzed to determine a square footage per floor. The number of building floors can be determined by the length of the building's shadow at a known sun angle. Alternatively, the gross floor area may be accessed through a government agency, such as a government taxing agency. In one embodiment, the gross floor area is stored at and received from a real estate server. After receiving step 502 is completed, control passes to capturing step 504.

At capturing step 504, a plurality of images of an interior room of the building is captured with an image sensor. Various image sensors know to those skilled in the art may be used to capture the images. In one embodiment, images of the interior room are captured using multiple cameras with differing optical zooms and aperture openings. During capturing step 504, control may be passed to determining step 506.

At determining step 506, the processor of the computing device determines a planar surface in the images corresponding to a floor surface of the interior room. Various techniques known in the art may be used to detect the planar surface. For example, U.S. Pat. No. 9,070,194B2, incorporated herein by reference, discloses methods for detecting one or more planar surfaces within a physical environment by obtaining a collection of three-dimensional surface points of a physical environment from one or more optical sensors. Planar surfaces are identified within the collection of three-dimensional surface points such that each planar surface is at least partially defined by a group of polygons containing at least a threshold number of polygons. After determining step 506 is completed, process flow continues to identifying step 508.

At identifying step 508, the processor of the computing device identifies a plurality of corners in the images forming vertices of a bounded floor area on the planar surface. The bounded area may be the entire interior room area, such as an entire garage room, or a portion of the interior room, such as a staircase landing area.

Various techniques known in the art for identifying corners in images may be used by the processor. U.S. Patent Application Publication No. US20200034623A1, incorporated herein by reference, discloses methods and apparatuses for corner detection. Optionally, a corner in an image is detected by applying a Harris corner detection to the image. For example, U.S. Pat. No. 9,640,142B2, incorporated herein by reference, describes a method for detecting a region of interest. A plurality of corner points of a target region is detected, and the detection may be based on the Harris corner detection algorithm. The region of interest is detected based on the plurality of corner points. Another technique that may be employed is the SUSAN (Smallest Univalue Segment Assimilating Nucleus) algorithm. U.S. Pat. No. 8,456,711B2, incorporated herein by reference, describes corner sharpening methods and apparatus based on a modification of the SUSAN algorithm for corner detection. Another approach to corner detection is the FAST (Features from Accelerated Segment Test) algorithm. For example, U.S. Pat. No. 9,977,977B2, incorporated herein by reference, discloses a FAST corner-detector computer vision feature computation block implemented in hardware. This patent further discloses that in some implementations, a vision sensor may output FAST corner locations and optionally image segments around FAST-detected corners. After identifying step 508 is completed, control passes to receiving step 510.

At receiving step 510, the processor receives an indication by a user of the computing device that the bounded floor area is a non-qualifying area and should be deducted from the gross floor area. The user input can be received, for example, as a response to a dialog box displayed on the device display or by audio confirmation through the device microphone. After receiving step 510, control continues to determining step 512.

At determining step 512, the processor determines an adjusted floor area. The adjusted floor area is computed by subtracting the bounded floor area from the gross floor area. For example, a building with a gross floor area of 1,200 ft$^2$ and a non-qualifying garage with a floor area of 200 ft$^2$ has an adjusted floor area of 1,000 ft$^2$. For residential buildings, the adjusted floor area may provide a more accurate measurement of the building's livable area.

A building may include several non-qualifying areas that require to be subtracted from the gross floor area. In this case, as shown in FIG. 5A, after determining step 512 is completed, control flow may return capturing step 504. For each non-qualifying area in the building, the capturing step 504, determining 506, identifying step 508, receiving step 510, and determining step 512 are repeated until a final adjusted floor area calculation is determined for the building. After the final adjusted floor area is calculated, the adjusted floor area is transmitted to the remote inspector at transmitting step 514.

In one embodiment, the method includes combining step 516. At combining step 516, the images captured by the image sensor are digitally combined to produce a panorama image of the interior room. The panorama image can then be transmitted to the remote inspector for review and inclusion in an inspection report.

Various techniques known in the art can be used to stitch images captured by the inspection device. For example, images can be stitched into a mosaic using image gradient calculation. In U.S. Patent Application Publication No. US20200242786A1, incorporated herein by reference, image registration is achieved by calculating a correlation coefficient image between a reference image and a floating image and calculating a gradient image of the correlation coefficient image. Another technique that may be employed is fast image blending based on the graph cuts algorithm. U.S. Pat. No. 8,593,506B2, incorporated herein by reference, uses an iterative graph cuts approach for forming a panoramic image of a scene from a sequence of input frames captured by a camera having an optical center that translates relative to the scene. A further approach to image stitching is to implement image stitching by adopting feature-based alignment algorithm and blending algorithm to produce a panoramic image. For example, U.S. Patent Application Publication No. US20200302584A1, incorporated herein by reference, discloses sampled feature points distributed across different grid tiles within overlap regions for pairs of images to match feature points to inform the alignments of a pair with respect to each image in the pair.

In one embodiment of the invention, the processor verifies that the inspection device is located at the intended building. For example, at capturing step 504, the process may follow path "B" to computing step 518 (see FIG. 5B).

At computing step 518, the processor of the computing device computes a current location of the computing device based on GPS signals received by the GPS receiver. GPS positioning is well known to those skilled in the art and provides accurate location information of the inspection device. Other location technologies, such as cell tower triangulation, may be used by the inspection device. After computing step 518 is completed, control passes to comparing step 520.

At comparing step 520, the processor compares the computed current location of the inspection device to the historical location of the building obtained at receiving step 501. If the computed current location of the inspection device does not match the historical location of the building an alert message is displayed at displaying step 522. The alert message may be displayed at the inspection device and the remote inspector computer.

In one configuration, the remote inspector may instruct the inspection device user within the building to aim the image sensor of the inspection device at a particular location. Such functionality starts at receiving step 524, where a pointer message is received. The pointer message includes a pointer location. In response to receiving step 524, control passes to overlaying step 526.

At overlaying step 526, the processor digitally overlays a pointer image on a real-time image of the real-world scene captured by the image sensor. The pointer image guides a user of the computing device to point the image sensor at the pointer location. After overlaying step 526 is completed, the real-time image and the pointer image is displayed on a display screen of the computing device at displaying step 528.

Figure 6:
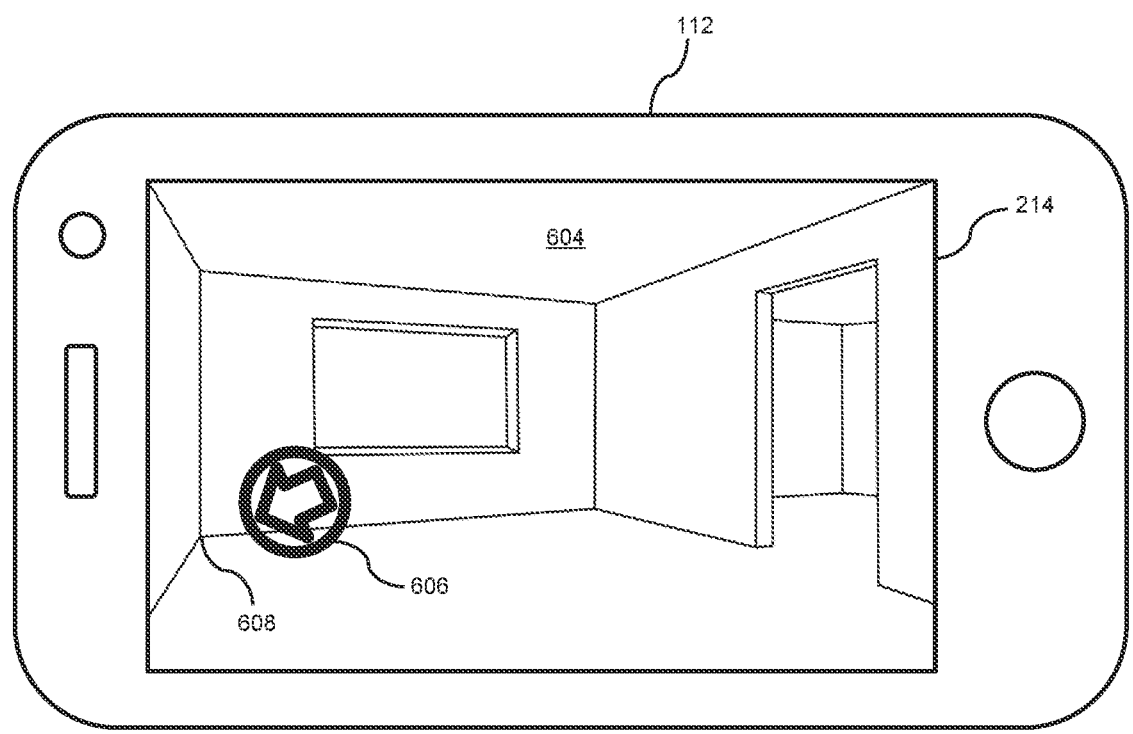
FIG. 6 shows one embodiment of the inspection device configured in a smartphone.

FIG. 6 shows one embodiment of the inspection device 112 configured in a smartphone. The inspection device 112 includes a display 214 showing to a user a real-time image 604 captured by the image sensor. The display 214 also shows a pointer image 606 overlapping the real-time image 604. As mentioned, the pointer image 606 directs the user of the device 112 to point the image sensor at a pointer location 608. The pointer image 606 may initially be positioned at the edge of the display 214. As the user aims the image sensor closer to the desired pointer location 608, the pointer image 606 moves closer to the center of the display 214. This indicates to the device user that the device 112 is being moved toward the desired pointer location 608. On the other hand, if the device user moves the device 112 away from the desired pointer location 608, the pointer image 606 is moved away from the display center in a direction opposite the device movement.

Returning to FIG. 5B, the inspection device may be configured to supply additional lighting when there is too little ambient light to properly illuminate the interior room during inspection. For example, at receiving step 530, a light activation message is received from the remote inspector. The light activation message may be sent by the remote inspector if additional lighting is necessary for the image sensor to sufficiently discern room details. In response to the light activation message, method flow continues to activating step 532. During activating step 532, an artificial light, such as an LED, is activated to illuminate the inspection scene in the interior room.

In one embodiment of the invention, the inspection device allows the remote inspector to magnify images captured by the image sensor. For example, at receiving step 534 (see FIG. 5C), a magnification message is received by the inspection device. The magnification message may include a magnification factor.

In response to the magnification message, the real-time image captured by the image sensor is magnified by the magnification factor at magnifying step 536. Optical magnification may be achieved by moving lens elements in the image sensor. Alternatively, the processor may digitally zoom the captured image. If the inspection device is equipped with multiple image sensors, the processor may switch to an image sensor with a higher image magnification and a narrower field of view.

After magnifying step 536 is completed, process flow may return back to determining step 506 (see FIG. 5A) through path "A".

Embodiments disclosed herein allow an inspector to conduct a building inspection or appraisal without visiting the building. In particular embodiments, a gross living area (GLA) can be computed for a building without the need for an inspector to enter the building.

The inspection device can provide a comprehensive inspection platform. The platform can enable inspector driven video calling for a virtual appraisal where the inspector can operate onsite devices to capture the images, an appraisal order management system with dynamic form creation, an exterior property view using third party platform, capturing non-GLA component measurements using automatic corner/markup techniques, as well as augmented reality and artificial intelligence techniques.

Additionally, the inspection device can capture a 360-degree view of the property. Secured storage can record all captured images and the recorded video call between the remote appraiser and the inspection device user for future reference. Software can provide multilanguage support for non-English speaking users. The inspection platform can schedule inspection or appraisal appointments, provide video call links, and inspection or appraisal application links.

For example, a remote inspector and a property occupant can join a video call using a smartphone application. During the video call, the remote inspector can record property details with assistance from the property occupant without visiting the property using the smartphone application. The smartphone application enables capturing of GLA measurements and building sketches that include both interior and exterior areas of the property. The smartphone application allows capturing of images with labels and markups tagged with current geographical location and time. The smartphone application can also capture 360-degree views of the property. The remote inspector can fill inspection forms and submit appraisal orders to an appraisal management company.

Figure 7:
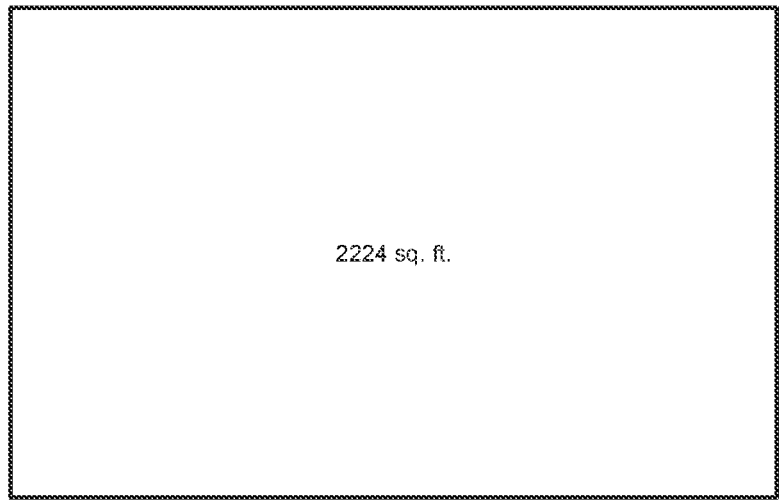
FIG. 7 shows a whole property sketch with a measurement.
Figure 8:
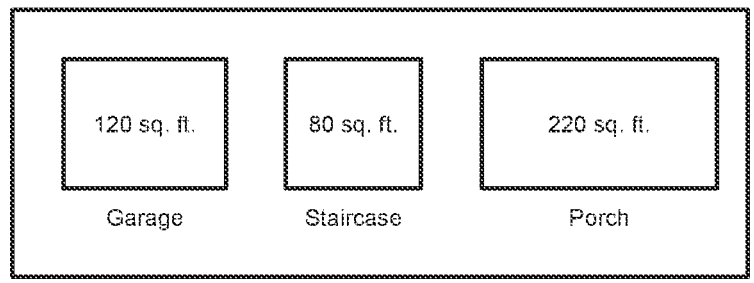
FIG. 8 shows a property sketch with three non-GLA areas labeled "Garage", "Staircase", and "Porch".

In one embodiment, the system captures a whole property sketch with measurements. FIG. 7, for example, shows a whole property sketch with a measurement of 2,224 sq. ft. Next, the system asks the property occupant if there are any non-GLA areas in the property. If the property occupant inputs that non-GLA areas are present, the system asks the property occupant to select a predefined non-GLA area or add a new area. Next, the system captures the non-GLA area's sketch and measurements. This process is repeated until all non-GLA areas are recorded. FIG. 8, for example, shows a property sketch with three non-GLA areas labeled "Garage", "Staircase," and "Porch".

Figure 9:
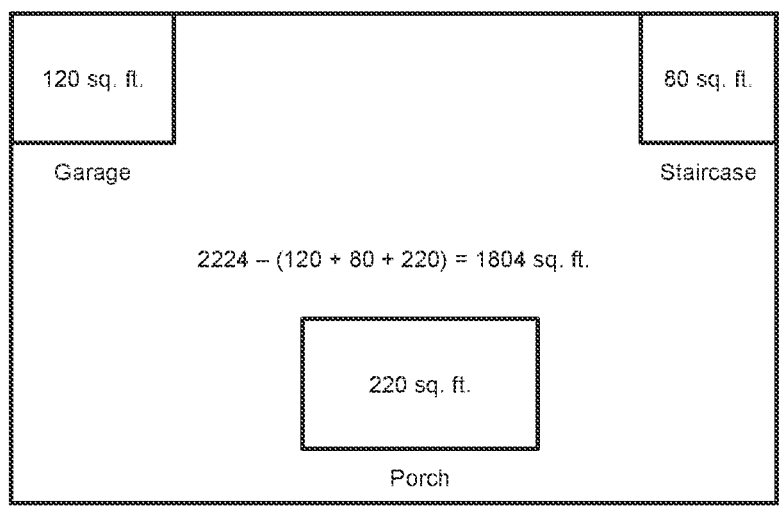
FIG. 9 shows three non-GLA areas placed on a whole property and a computed GLA measurement.

Next, the system prompts the property occupant to create a GLA sketch with measurements. All non-GLA areas are then displayed, and the property occupant can drag the non-GLA areas on the property sketch one by one. Once all non-GLA areas are placed on the sketch, the system creates a GLA sketch with measurements. Next, the system subtracts non-GLA area measurements from the total property measurement to provide a total GLA area. FIG. 9, for example, shows the three non-GLA areas placed on the whole property and a computed GLA measurement of 1,804 sq. ft. The GLA measurement feature may use augmented reality, machine learning, and artificial intelligence. The system may produce a 360-degree view of the property and a street view of the property.

Figure 10:
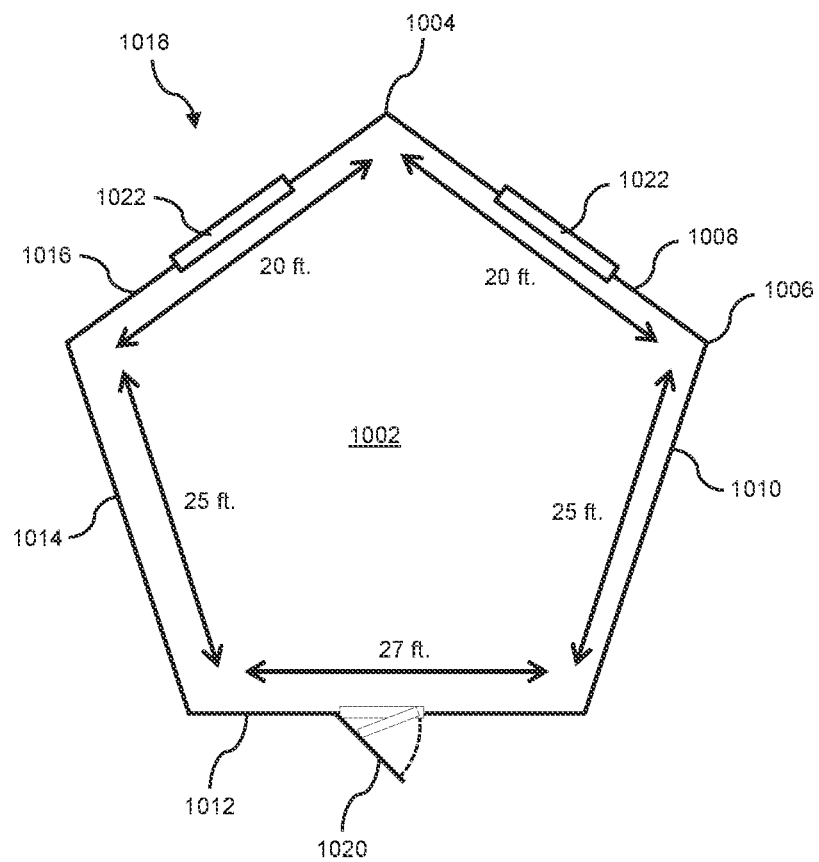
FIG. 10 shows an example floorplan generated by the inspection device for an interior room according to an embodiment of the present invention.

FIG. 10 shows an example floorplan 1018 for an interior room 1002 with five corners measured in accordance with an embodiment of the present invention. The property occupant begins by drawing a line on the display screen of the inspection device from a first corner 1004 to a second corner 1006 of the room 1002. The application measures the distance of a first wall 1008 between the two corners using augmented reality. For example, the application may use the ARKit and RealityKit, developed by Apple Inc., to implement 3D simulation and rendering.

In some embodiments, the inspection device detects doors and windows. Detected doors and windows can be included in the building floorplan 1018 generated by the inspection device. Particularly, the inspection device uses an image sensor to capture wall images with doors and/or windows. A processor detects doors and/or windows in the captured wall images and adds door symbols 1020 and window symbols 1022 to the building floorplan 1018 accordingly.

For example, the building occupant may point the image sensor at a wall of an interior room with a door or a window. A processor in the inspection device uses a deep learning algorithm with a large database of window and door image to detect the door or window. With the help of such machine learning models, the processor can identify the captured doors and windows in the interior room. Once identified, door symbols 1020 and window symbols 1022 are added to an appropriate location in the building floorplan 1018.

In some embodiments, processing the images to determine the plurality of corners in the images includes detecting at least two wall surfaces intersecting the floor surface at floor edges, extrapolating the floor edges to an intersection point, and identifying the intersection point as a corner of the plurality of corners in the images. For example, in FIG. 11, in addition to detecting a floor surface 306, a first planar wall surface 1102 and a second planar wall surface 1104 of the interior room 302 are detected by the inspection device. Planar surface detection may be performed using various methods, such as those discussed above.

The inspection device further detects a first wall edge 1106 where first planar wall surface 1102 meets the floor surface 306 and a second wall edge 1108 where second planar wall surface 1104 meets the floor surface 306. Next, the inspection device extrapolates the wall edges 1106 and 1108 to an intersection point 1110. The intersection point 1110 thus defines a corner forming a floor area vertex of the interior room 302.

Figure 11:
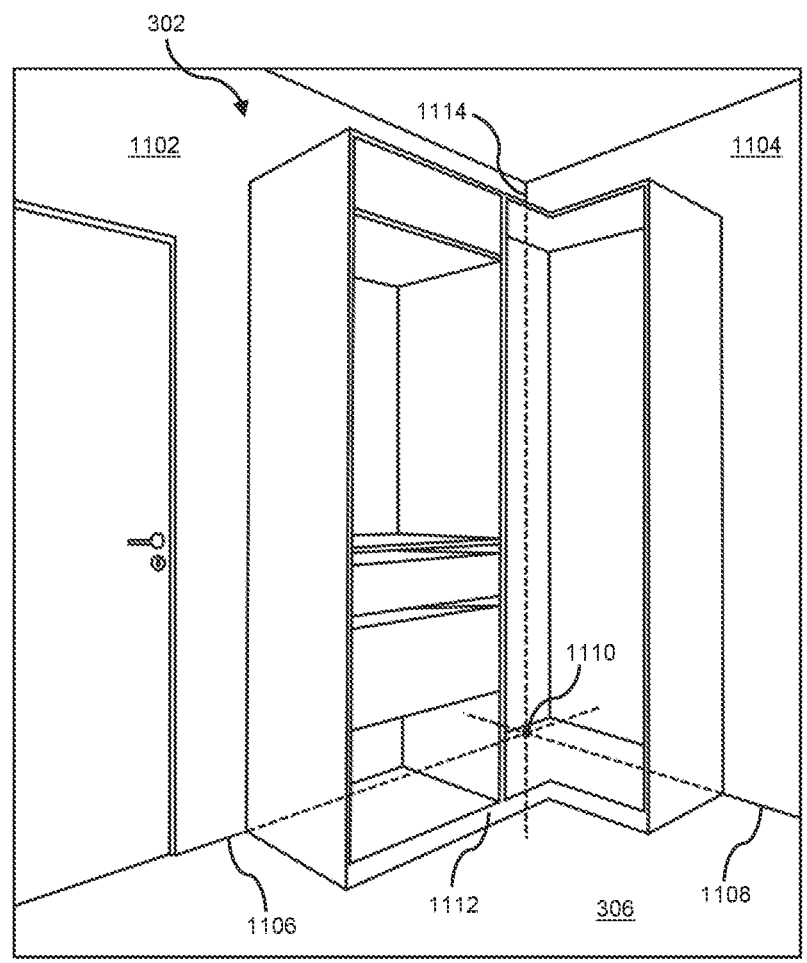
FIG. 11 illustrates interior room corner detection by extrapolating wall edges, in accordance with an embodiment of the present invention

In one embodiment, ARKit is used with 3D space data to extrapolate wall edges. For example, ARKit extends the first and second wall edges 1106 and 1108 in the same angle and direction, respectively, as shown in FIG. 11. The edges are extended until their intersection point 1110 is found. Once the intersection point 1110 is found, the inspection device stops measuring distance and identifies the intersection point 1110 as a corner of the interior room 302.

Extrapolating the wall edges to an intersection point is particularly advantageous when an object 1112, such as a piece of furniture, obstructs a room corner. In one embodiment, the inspection device may extrapolate a wall-to-wall edge 1114 formed where the first planar wall surface 1102 meets the second planar wall surface 1104 to the floor surface 306. The extrapolated wall-to-wall edge 1114 provides a third point of reference to determine intersection point the intersection point 1110. Thus, extrapolating the wall-to-wall edge 1114 can provide additional accuracy to the corner point measurement.

The inspection device's position, orientation and distance to objects and surfaces may be calculated by means of images captured by the image sensor, motion sensors, and the ARKit. The ARKit uses a captured image to help determine the position of the image sensor in space. In one embodiment, the property occupant stands in the center of an interior room and points the image sensor of the inspection device at a wall 1102. Data from the ARKit is used to determine the wall position in the 3D space. The orientation of the device is used to get the wall's orientation.

The display of the inspection device may indicate to the building occupant when an intersection point 1110 is detected. Augmented reality may be used to digitally overlay a corner marker on the images from the image sensor in response to detection of the intersection point 1110.

Augmented reality can be used to take measurements between two corners. The augmented reality position of a point in the real world can be acquired with a three-dimensional point (x, y, z). Once the positions of two points are known, the distance between these points can be determined using the Euclidean distance formula, $$\sqrt{[(x_1-x_2)^2+(y_1-y_2)^2+(z_1-z_2)^2]}.$$

After the distance between the first wall 1008 is determined, the distance is stored in device memory. The property occupant repeats the measurement process for remaining walls 1010, 1012, 1014, and 1016. Once the property occupant reaches the first corner 1004 again, the application uses the distance of all room walls to determine the room area.

It is contemplated that various methods for collecting distance information may be utilized by embodiments of the invention. By way of illustration only, a LiDAR scanner may be used. In addition, stereoscopic systems employing two image sensors, spaced slightly apart yet looking at the same scene, may be used as well. By analyzing the slight differences between the images seen by each image sensor, it is possible to determine the distance at each point in the images. In yet another embodiment, distance information may be compiled by using a single image sensor, travelling at a known velocity, to capture building details the scenery passes by. Image sensor velocity may be measured by an IMU, for example. Subsequent frames may be compared to extract the different distances between the objects and the image sensor based on the motion velocity.

Thus, if a remote inspector desires to determine a building's GLA measurement, the inspector communicates with the inspection device carried with the building occupant. The inspection device prompts the building occupant to begin taking area measurements, as described above. Exterior building measurements can be acquired using, for example, third-party aerial views and machine learning algorithms. The system can measure interior closed areas with the assistance of, for example, automatic wall and corner detection algorithms, deep learning algorithms and artificial intelligence algorithms. Measuring open areas, such as staircases, uses, for example, markup of one place to another place and calculating distance between two or more marked points using augmented reality and artificial intelligence. The interior non-GLA area and open area measurements are subtracted from the total exterior view to arrive at an accurate GLA calculation.

In one embodiment, the Cortex AI platform developed by Matterport, Inc. is used to transform interior room images into an interactive three-dimensional model. The Cortex platform may identify objects within rooms, stitch images together, and reconstruct building spaces into an immersive virtual tour. The inspection device may leverage Cortex's deep learning neural network to create three-dimensional data from various capture devices, such as LiDAR scanners, 360-degree cameras, and smartphones. The platform can provide automatic measurements for building rooms and objects in the rooms, automatic 2D-from-3D HD photo gallery creation, auto face blurring for privacy protection, custom videos, walkthroughs, auto room labeling, and object recognition.

During the inspection or appraisal process, remote inspectors can activate the inspection device's flash if they determine there is insufficient ambient light. Socket messages communicated between the remote inspector and the inspection device can be used to activate and deactivate a light at the remote device.

Inspectors can point on the display to regions of interest in the building using pointers to guide device users to the regions of interest. Socket messages communicated between the remote inspector and the inspection device can be used to display a pointer on the inspection device's display. For example, an inspector computer can send a socket message with screen coordinates for the pointer to the inspection device. After receiving the pointer socket message, the inspection device maps the screen coordinate to the device screen and displays the pointer on the device screen.

Inspectors can control image zoom on the inspection device to capture images of damage to or important details of the property. The remote inspector can also capture images of the property using the inspection device. Socket messages communicated between the remote inspector and the inspection device can be used to control the zoom factor of the remote device's image sensor.

When a remote inspector wants to capture an image from the inspection device user, the inspector clicks a button to send a socket message to the inspection device. In response to receiving the socket message, the inspection device captures an image from the image sensor. The inspection device attaches a current time to the image. The current location of the device can also be determined with the assistance of, for example, Google location services. The location data is also attached to the image. Once time and location metadata is attached, the image is sent from the inspection device to the remote inspector's computer.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method, or computer program product. Accordingly, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random-access memory (RAM), a read-only memory (ROM), an erasable programmable read-only memory (EPROM or Flash memory), a static random-access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Certain embodiments of this invention are applied to prepare a live, real-time floor plan for users using an inspection device such as a mobile phone or other mobile device (e.g., a mobile tablet device, smartphone) as part of or while a main floor plan is being constructed. This application provides a real-time visual representation in the form of a mini-map of what a floor plan will look like during the measurement of the rooms in a building. These embodiments combine the elements of remote inspection, remote measurement, and remote photo/video capture, in a single application. They provide critical advantages to users and improve the conducting, speed and availability of appraisals, inspections, and real estate evaluations.

For example, a user with a mobile device, such as a property owner, or other user located in the building of interest, can follow the instructions given by the application and/or by another user of the application, who may be working remotely (e.g., an appraiser), to move the mobile device to different areas of interest to get the measurements for the building and its component rooms. The application uses these measurements to prepare a floor plan for the building. The floor plan, or a portion thereof, is available after the measurements of a particular area in the building are done, and then of the entire building (or the desired portion thereof) when the measurements are completed.

In particular, the user on site (e.g., property owner) will get on a virtual call with a remote user (e.g., appraiser) and click a "start measurement" (or other similar name) option pursuant to the remote user's guidance. In certain preferred embodiments, this may be after the user on site has downloaded and installed an application of this invention in their mobile device. The measurement activity can be started and the application and/or remote user can guide the user on site to move the mobile phone up/down, far/close, etc., as required. Based on the ongoing measurements, the application can provide a visual cue (e.g., a guide, representation, superimposed line or lines, arrow, indication, floor plan or some other marker or information) in real time on a screen, which, in some embodiments, can be a quick and pictorial preview of the final outcome of the floor plan.

Figure 12:
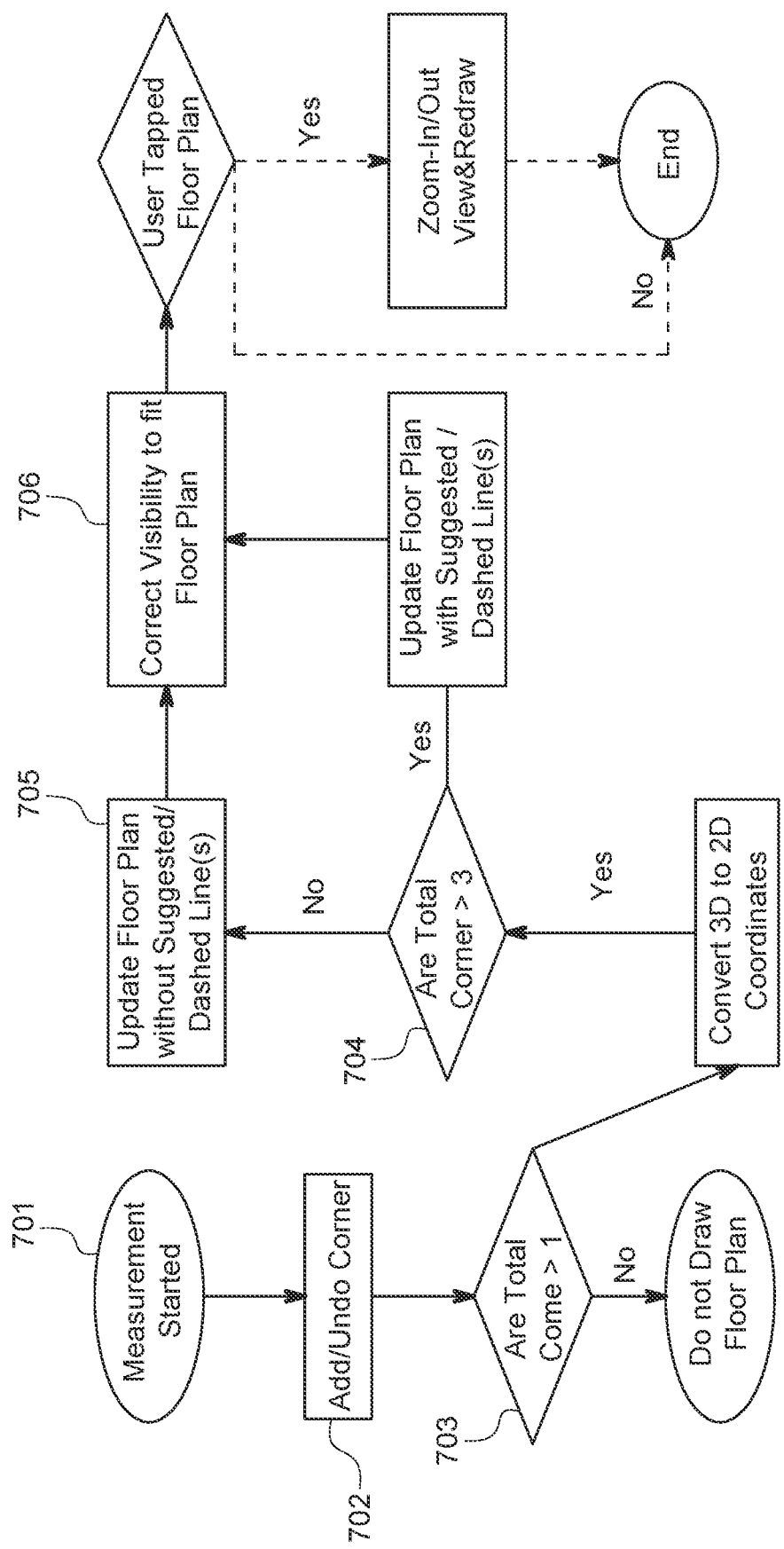
FIG. 12 illustrates an example of certain embodiments of this invention that provide a live, real-time floor plan view to a user as the final floor plan is being created.

FIG. 12 illustrates certain of these embodiments, wherein a measurement process is started 701; corner information (i.e., add/undo) is processed 702; whether more than one corner has been processed is determined 703; 3D coordinates are converted to 2D coordinates; and whether more than three corners have been processed is determined 704. If more than three corners have been determined, the floor plan with suggested dashed line(s) is updated 705 and the visible image is corrected to fit the floor plan 706.

If less than 3 corners are determined, the floor plan is updated without suggested/dashed line(s). After this update, the visible image is corrected to fit the floor plan 706.

After the visible image is corrected to fit the floor plan the user taps the mobile device screen accordingly 706. The view is zoomed (in or out) and the floor plan is redrawn. These steps continue until they no longer apply pursuant to FIG. 12.

In certain of the preferred embodiments that provide an image of measurements of rooms, such as floor plans, as the measurements are being created (e.g., in the form of a line, series of lines, or a mini-map superimposed on the image of an interior room), a mobile device application for conducting a search, evaluation, appraisal and/or inspection of a building containing one or more interior rooms is used.

In these preferred embodiments, the application comprises a non-transitory computer readable storage medium having computer readable program code embodied therewith, the computer readable program code configured to perform a plurality of functions.

These functions comprise: (a) identifying the corners of a first interior room; (b) generating 3D coordinates corresponding to the corners of the first interior room; (c) converting the 3D coordinates to 2D coordinates; (d) generating a floor plan of the first interior room using the 2D coordinates; and (e) displaying the floor plan of the first interior room on a screen of the mobile device in real-time as the application is being used. After these functions are performed for the first interior room, they are repeated for each additional interior room, if any. Specifically, (a), (b), (c), (d) and (e) are repeated for each additional interior room, if any.

A floor plan is then generated of the building by combining the floor plans of the first interior room and each additional interior room, if any. Optionally, the application can be used to calculate a desired surface area measurement (e.g., GLA) of the first interior room, each additional interior room, and/or the building. The application is also capable of transmitting data concerning the first interior room, each additional interior room, and/or the building to a remote user who is conducting the search, evaluation, appraisal and/or inspection of the building.

Thus, it is a feature of certain of these embodiments, that a floor plan, or a portion thereof, can be visualized live while the measurements of the building are in progress in real-time. This feature can provide a quick preview to a user of what the outcome of the measurements is going to be.

Native frameworks can be used to draw the floor plans by the application of these embodiments. In these embodiments, Apple Development Tools such as a UIKit framework can provide basic features to draw shapes. Classes such as CAShapeLayer, CALayer, UIBezierPath, and UIScrollView can be used to perform the drawing on plain view. For the live floor plan, the drawing of the floor plan can be based on a placement/undo of a corner of a room. An array of (x, y, z) can be passed to a MinimapView class that is dedicated to the live floor plan creation.

In these embodiments, the logic for the main floor plan and the live floor plan can be the same. From an array of (x, y, z), the angles and relative distance between two coordinates are determined and converted to 2D (x, y) coordinates. The relative distance is determined according to the device screen size (e.g., 3.28084 feet on the screen is occupied by 100 pixels). The text measurement that is displayed to a user is real and follows the same logic that could be followed in an AR Camera view.

These embodiments and certain other embodiments of this invention are capable of using LiDAR based systems to make measurements. With these systems and similar systems, a scanner determines the distance between itself and an object by monitoring how long it takes a pulse of light (often a laser) to bounce back. LiDAR is similar to radar, except that instead of using radio waves, it uses infrared light. LiDAR also works on a relatively small scale, due to the way light is absorbed by objects in its path. By sending hundreds of thousands of light pulses every second, LiDAR scanners can work out distances and object sizes with relative accuracy over relatively short distances.

When LiDAR is applied to these embodiments and certain other embodiments of this invention, tools such as ARKit can perform ray-casting more effectively. Ray-casting is a method for finding positions on surfaces in a real-world environment. LiDAR helps to detect horizontal and vertical planes with speed and accuracy benefits. Generally, planes can be detected in three levels: (1) with same size (existingPlaneGeometry), (2) estimated size (estimatedPlane), and (3) infinite size (existingPlantInfinite). LiDAR may boost the first and second levels.

In addition, surface, wall and object detection can be faster with LiDAR while the mobile device is ray-casting. In these embodiments, when a LiDAR sensor is available, ceiling/centre-wall measurements are enabled because of the LiDAR benefits of processing surfaces of ceilings with favorable speed and accuracy (e.g., using existingPlaneGeometry and estimatedPlane). LiDAR also helps to keep the pipe/corner-indicator object sticky on a desired location/corner as an AR world environment is determined by LiDAR. LiDAR has advantages (e.g., accuracy) if the distance of an object is 4 to 5 meters from the mobile device, confirming its usefulness for ceilings.

Thus, in preferred embodiments of this invention, when LiDAR is available on a mobile device, the ceiling measurement option can be enabled. LiDAR can enhance the accuracy and the efficiency of the detection/measurement of the applicable planes when using ARKit in finite mode. AR itself aids the finding of planes in finite mode when LiDAR is available. LiDAR is used in certain preferred embodiments because it may provide more accurate measurements (e.g., of ceilings) than using mobile devices without LiDAR capabilities.

Figure 13:
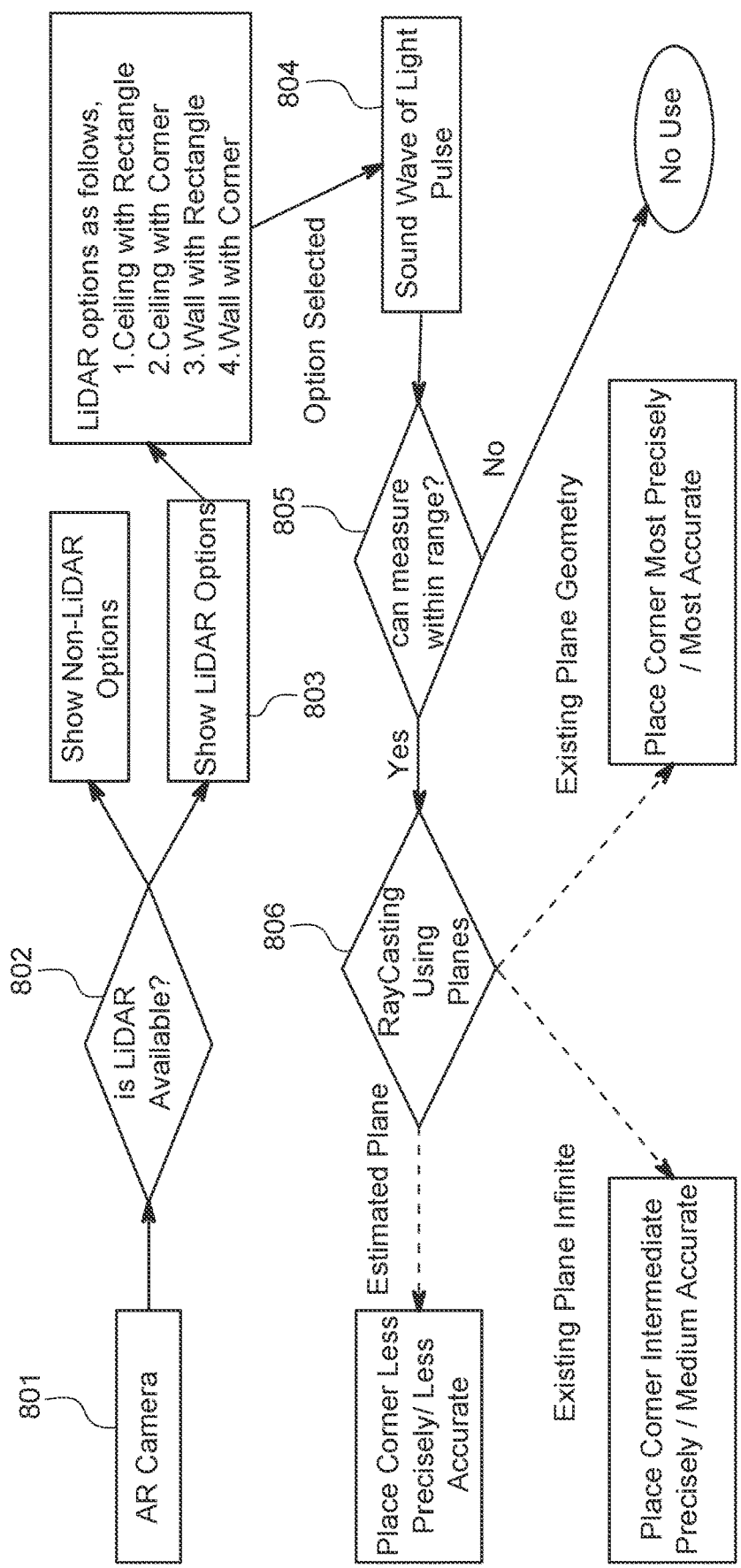
FIG. 13 illustrates an example of certain embodiments of this invention using LiDAR (also referred to as Lidar) and similar measurement device related tools and processes.

FIG. 13 illustrates certain embodiments of this example with different features that are provided if LiDAR (or Lidar) is available. Using an AR camera 801, if LiDAR is not available, a certain path is taken (not shown in FIG. 13). If LiDAR is available 802, the LiDAR options that are available are provided to the user 803. These may include the options of choosing (1) ceiling with rectangle, (2) ceiling with corner, (3) wall with rectangle, and (4) wall with corner. After an option is selected 804, the LiDAR is activated and it is determined whether the range permits measurement 805. If yes, then ray-casting is performed 806 and corner information is processed pursuant to FIG. 13.

In certain of the preferred embodiments of a method for conducting a search, evaluation, appraisal and/or inspection of a building containing one or more interior rooms, the method comprises a user on site using a mobile device containing an application, and a remote user that can direct the user on site and thereby the remote user can perform a search, evaluation, appraisal and/or inspection of the building.

The preferred embodiments of this method comprise: (a) generating a floor plan of a first interior room by a user on site using the mobile device containing the application, the application comprising a non-transitory computer readable storage medium having computer readable program code embodied therewith, the computer readable program code configured to perform a plurality of functions These functions comprise: (1) identifying the corners of an interior room; (2) generating 3D coordinates corresponding to the corners of the interior room; (3) converting the 3D coordinates to 2D coordinates; (4) generating a floor plan of the first interior room using the 2D coordinates; and (5) displaying the floor plan of the first interior room on a screen of the mobile device in real-time as the application is being used.

The method also comprises: (b) transmitting data concerning the first interior room and/or the floor plan of the first interior room using the mobile device to the remote user who can access the data and provide feedback to the user on site on the placement and use of the mobile device and thereby the remote user can conduct a search, evaluation, appraisal and/or inspection of the interior room.

The method further comprises: (c) generating a floor plan of each additional interior room, if any, using the application and functions of (a); (d) transmitting data concerning each additional interior room, if any, and/or the floor plan of each interior room, if any, using the mobile device to the remote user who can provide feedback to the user on site on the placement and use of the mobile device and thereby conduct a search, evaluation, appraisal and/or inspection of each additional interior room; and (e) optionally, calculating a measurement of surface area (e.g., GLA) of the first interior room, each additional interior room, and/or the building.

The advantages and uses of the features and functions of the embodiments of this example include that it can provide a remote technology driven inspection. Embodiments can be configured to allow a user such as an appraiser, who is not on location, to view, photograph and measure a real estate property (e.g., a home, an office, a factory) in real-time on the effective date of inspection. Embodiments can also be configured to allow live conversation between the remote user and the user who is on site with the mobile device (e.g., a homeowner).

Because of these advantages and uses, certain embodiments of this invention can be used to provide an acceptable appraisal and/or inspection under recognized standards (e.g., USPAP). Furthermore, securitization entities (e.g., a rating agency, such as S&P Global/Deephaven Mortgage) may accept the use of certain of these embodiments as collateral tools (e.g., a homeowner assisted video tool) for rating agency trades. GSE policy may also accept these embodiments to provide supervisor-trainee appraisals and for desktop appraisal guidance (e.g., provide an inspection means that an appraisal can rely on to generate an interior floorplan with wall partitions).

With the possibility of public health related lockdowns and quarantines, natural and manmade disasters, homeowner's concerns about security, and the lack of appraisers in many locations, the remote inspection and measurement technology of the embodiments of this invention allow the financial services, insurance and real estate industries, among others, to continue to operate, serve real estate owners, and provide accurate and timely appraisals of property. Embodiments of this invention may preserve crucial elements of "arms-length" veracity with an appraiser driving the process (or an inspector) and allows the professional to observe, photograph, video record, and measure the real estate (e.g., home), all using the property contact's mobile device (e.g., smart phone). These embodiments can be critical components to advance the future of property valuation and extend the appraisal profession to as many consumers as possible. These embodiments can extend the measurement capabilities to scan rooms and create measurements and floorplans that can be automated and used by lenders and consumers to accurately depict a property's dimensions. Additional advantages and uses of these embodiments will be apparent to a person of skill in the art.

The most preferred embodiments of this invention using the display overlay features and a remote and on-site application include a system for conducting a search, evaluation (e.g., valuation), appraisal and/or inspection of a building containing one or more interior rooms. The system comprises (a) a remote-based application and (b) a mobile device application. In more preferred embodiments of the application, the application has multiple functions, some of which are used by a remote user and some of which are used by a user on site, so that only one actual application is needed for both users.

In these embodiments, the remote-based application (e.g., for a mobile device that is used remotely from the building; a web-based version using a browser as an interface) is capable of being used by a remote user (e.g., an appraiser) and it comprises a non-transitory computer readable storage medium having computer readable program code embodied therewith. The computer readable program code is configured to perform a plurality of functions. These functions comprise: (1) connecting with the mobile device application, which is capable of being used by a user on site at the building through a network; (2) receiving data from the mobile device application; and (3) optionally, sending data (e.g., a pointer message, instructions, alerts, measurements, known GLA information, building location) to the mobile device application.

In these embodiments, the mobile device application comprises a non-transitory computer readable storage medium having computer readable program code embodied therewith. The computer readable program code is configured to perform a plurality of functions that comprise: (1) operating the camera-related functions of the mobile device as the mobile device is moved through the building containing one or more interior rooms. In preferred embodiments, these mobile devices can include mobile devices (e.g., Apple products, Samsung products) with LiDAR capabilities and/or other measurement capabilities connected with their camera functions.

These functions of the computer readable program code and/or internal functions of the mobile devices also comprise (2) identifying the corners of an interior room; (3) generating 3D coordinates corresponding to the corners of the interior room; (4) converting the 3D coordinates to 2D coordinates; (5) calculating one or more measurements (e.g., lines, points, surface areas) of the interior room using the 2D coordinates; (6) displaying one or more of the measurements of the interior room as an overlay of an image of the interior room on a screen of the mobile device in real-time (e.g., displaying a line and a measurement of the length of a wall as an overlay of an image of the wall on a screen of the mobile device).

After one interior room is completed, these steps, namely (1), (2), (3), (4), (5) and (6) above, can be repeated for one or more additional interior rooms, if any. Thus, for a three room building, the steps can be repeated three times, once for each room.

In these embodiments, optionally, the mobile device application is capable of calculating a measurement of surface area of the interior room, one or more additional interior rooms, and/or the building. This would include in preferred embodiments a measure of the GLA. It can also include a comparison between a given surface area (from another source or historical record) that is compared to what is measured by the system.

Also in these embodiments, the mobile device application can transfer data (e.g., photographs, videos, and/or measurements of the building, the interior rooms, or portions thereof) to the remote-based application. By using this system the remote user, such as an appraiser, can conduct a remote appraisal of the building. As an example, the appraiser can request that the user on site (e.g., a homeowner) take a picture of a particular part of a room (or the entire room, or stitch together images of portions of the room as described above), magnify such a picture if desired, and transfer the picture to the appraiser (i.e., the remote user).

And optional feature of these preferred embodiments is where the mobile device application connects to a Global Positioning System (GPS) receiver and receives a historical location of the building and transfers that historical location of the building to the remote-based application. In that way, for example, a remote user can confirm that the correct building is under study.

Another optional feature of these preferred embodiments is where the remote-based application is capable of sending a pointer message including a pointer location to the mobile device application and wherein the mobile device application is capable of displaying that pointer message as an overlay of an image of the interior room on a screen of the mobile device in real-time. In that way, for example, the remote user can direct the user on site to do a particular task or move to a particular location.

The most preferred embodiments of this invention using the display overlay features and a remote and on-site application also include a method for conducting a search, evaluation, appraisal and/or inspection of a building containing one or more interior rooms. The method comprises (a) connecting a remote-based application (e.g., a web-based version that uses a browser as a user interface, a mobile device application that is not located at the building being studied) used by a remote user through a network (e.g., the internet) to a mobile device application used by a user on site at the building containing one or more interior rooms.

In these preferred embodiments, the mobile device application is capable of accessing the camera-related functions of the mobile device as the mobile device is moved through the building containing one or more interior rooms.

In these preferred embodiments, the method also includes (b) calculating one or more measurements (e.g., distances, heights, lengths, widths, one or more points, one or more lines, areas) of an interior room of the building, the calculating comprising (1) identifying the corners of the interior room; (2) generating 3D coordinates corresponding to the corners of the interior room; (3) converting the 3D coordinates to 2D coordinates; and (4) calculating the one or more measurements of the interior room using the 2D coordinates. These steps are done by the mobile device application and/or the internal functions of the mobile device (e.g., an Apple or Samsung product that uses LiDAR and/or other ranging or measurement capabilities in connection with their cameras).

The method of these preferred embodiments also comprises (c) displaying one or more of the measurements of the interior room as an overlay (e.g., one or more lines, one or more points) of an image of the interior room on a screen of the mobile device in real-time.

The method of these preferred embodiments also comprises (d) calculating one or more measurements of one or more of the additional interior rooms, if any. The calculating would comprise (1) identifying the corners of the interior room; (2) generating 3D coordinates corresponding to the corners of the interior room; (3) converting the 3D coordinates to 2D coordinates; and (4) calculating the one or more measurements of the interior room using the 2D coordinates. The calculating is done by the mobile device application in conjunction with the capabilities of the mobile device itself as described herein.

The method of these preferred embodiments also comprises displaying one or more of the measurements of one or more of the additional interior rooms, if any, as an overlay of an image of the interior room on a screen of the mobile device in real-time.

The method of these preferred embodiments also comprises, optionally, calculating a measurement of surface area of the first interior room, one or more of the additional interior rooms, and/or the building (e.g., a GLA for the building).

The method of these preferred embodiments also comprises transferring data from the mobile device application to the remote-based application, the data comprising photographs, videos, and/or measurements of the building, the interior rooms, or portions thereof.

In certain of these preferred embodiments, the method also comprises connecting the mobile device application to a Global Positioning System (GPS) receiver; receiving a historical location of the building; and transferring that historical location of the building to the remote-based application.

In certain of these preferred embodiments, the method also comprises the remote-based application sending a pointer message including a pointer location to the mobile device application; and the mobile device application displaying that pointer message as an overlay of an image of the interior room on a screen of the mobile device in real-time.

The especially preferred embodiments of this invention include a single application that can be used by both a remote user and a user on site at a building being studies. This is a computer-based application for conducting a search, evaluation, appraisal and/or inspection of a building containing one or more interior rooms, and the application capable of being copied and simultaneously used by the remote user and a mobile device the user on site at the building. The application comprises several functions that are used by one or both of the users. These functions include accessing a non-transitory computer readable storage medium (e.g., on a remote user's desktop or laptop computer or mobile phone, on a user on site's mobile phone) having computer readable program code embodied therewith. In these embodiments, the computer readable program code is configured to perform or have performed a plurality of functions. These functions comprise: (1) the application of the remote user connecting with the mobile device of the user on site through a network; (2) the application of the remote user receiving data from the mobile device; and (3) optionally, the application of the remote user sending data to the mobile device of the user on site.

In these embodiments, these functions also comprise: (4) the application of the user on site accessing the camera-related functions of the mobile device as the mobile device is moved through the building containing one or more interior rooms; (5) the application of the user on site identifying the corners of an interior room; (6) the application of the user on site generating 3D coordinates corresponding to the corners of the interior room; (7) the application of the user on site converting the 3D coordinates to 2D coordinates; (8) the application of the user on site calculating one or more measurements of the interior room using the 2D coordinates; (9) the application of the user on site displaying one or more of the measurements of the interior room as an overlay of an image of the interior room on a screen of the mobile device in real-time; (10) the application of the user on site repeating (4), (5), (6), (7), (8) and (9) for one or more additional interior rooms, if any; (11) the application of the user on site, optionally, calculating a measurement of surface area of the interior room, one or more additional interior rooms, and/or the building; and (12) the application of the user on site transferring data to the application of the remote user, the data comprising photographs, videos, and/or measurements of the building, the interior rooms, or portions thereof.

In certain of these preferred embodiments, the application of the user on site connects to a Global Positioning System (GPS) receiver and receives a historical location of the building and transfers that historical location of the building to the application of the remote user. In certain of these preferred embodiments, the application of the remote user is also capable of sending a pointer message including a pointer location to the application of the user on site and wherein the application of the user on site is capable of displaying that pointer message as an overlay of an image of the interior room on a screen of the mobile device in real-time.

The advantages of the invention will be apparent to a person of skill in the art. It will be realized that the invention provides quick insight to a remote user, such as an appraiser, about the measurements and conditions of the property. For appraisals that comply with good practices and standards, it is important that the appraiser have access to the information necessary to conduct a full appraisal, and this information can be provided by this information.

This invention can also make appraisals and other inspections more efficient with less travel time, etc. The invention can provide the appraiser and other remote user with virtually the same opportunities and experiences as being on site.

The use of LiDAR and other range finding and measurement capabilities of mobile devices can be used by this invention to enhance the accuracy and precision of the measurements. For example, LiDAR technology is capable of using ceilings of rooms to make measurements in some applications, and ceilings, which lack furniture and other obstructions for the most part, can provide more accurate measurements of rooms.

What is claimed is:

1. A method for conducting an appraisal and/or an inspection of a building containing one or more interior rooms, the method comprising a remote user and a user on site at the building interacting with one another in real-time, the method further comprising:
   (a) connecting a remote-based application used by the remote user through a network to a mobile device application used by the user on site at the building containing one or more interior rooms, the mobile device application capable of accessing the camera-related functions of the mobile device as the mobile device is moved through the building containing one or more interior rooms;
   (b) calculating one or more measurements of an interior room of the building, the calculating comprising (1) identifying the corners of the interior room; (2) generating 3D coordinates corresponding to the corners of the interior room; (3) converting the 3D coordinates to 2D coordinates; and (4) calculating the one or more measurements of the interior room using the 2D coordinates;
   (c) displaying one or more of the measurements of the interior room as an overlay of an image of the interior room on a screen of the mobile device in real-time;
   (d) calculating one or more measurements of one or more of the additional interior rooms, if any, the calculating comprising (1) identifying the corners of the interior room; (2) generating 3D coordinates corresponding to the corners of the interior room; (3) converting the 3D coordinates to 2D coordinates; and (4) calculating the one or more measurements of the interior room using the 2D coordinates;
   (e) displaying one or more of the measurements of one or more of the additional interior rooms, if any, as an overlay of an image of the interior room on a screen of the mobile device in real-time;
   (f) calculating a measurement of surface area of the first interior room, one or more of the additional interior rooms, and/or the building; and
   (g) transferring data from the mobile device application to the remote-based application, the data comprising photographs, videos, and/or measurements of the building, the interior rooms, or portions thereof, to enable the remote user to view, photograph, and measure the building in real-time on the effective date of the inspection and conduct a conversation with the user on site through the mobile device.

2. The method of claim 1 further comprising:
   (h) the mobile device application connecting to a Global Positioning System (GPS) receiver; receiving a historical location of the building; and transferring that historical location of the building to the remote-based application.

3. The method of claim 1 further comprising:
   (h) the remote-based application sending a pointer message including a pointer location to the mobile device application; and
   (i) the mobile device application displaying that pointer message as an overlay of an image of the interior room on a screen of the mobile device in real-time.

\* \* \* \* \*